Jan. 24, 1939. A. DE LISLE 2,145,109
PROCESS FOR THE MANUFACTURE OF MILK SUGAR
Filed March 16, 1937 2 Sheets-Sheet 2
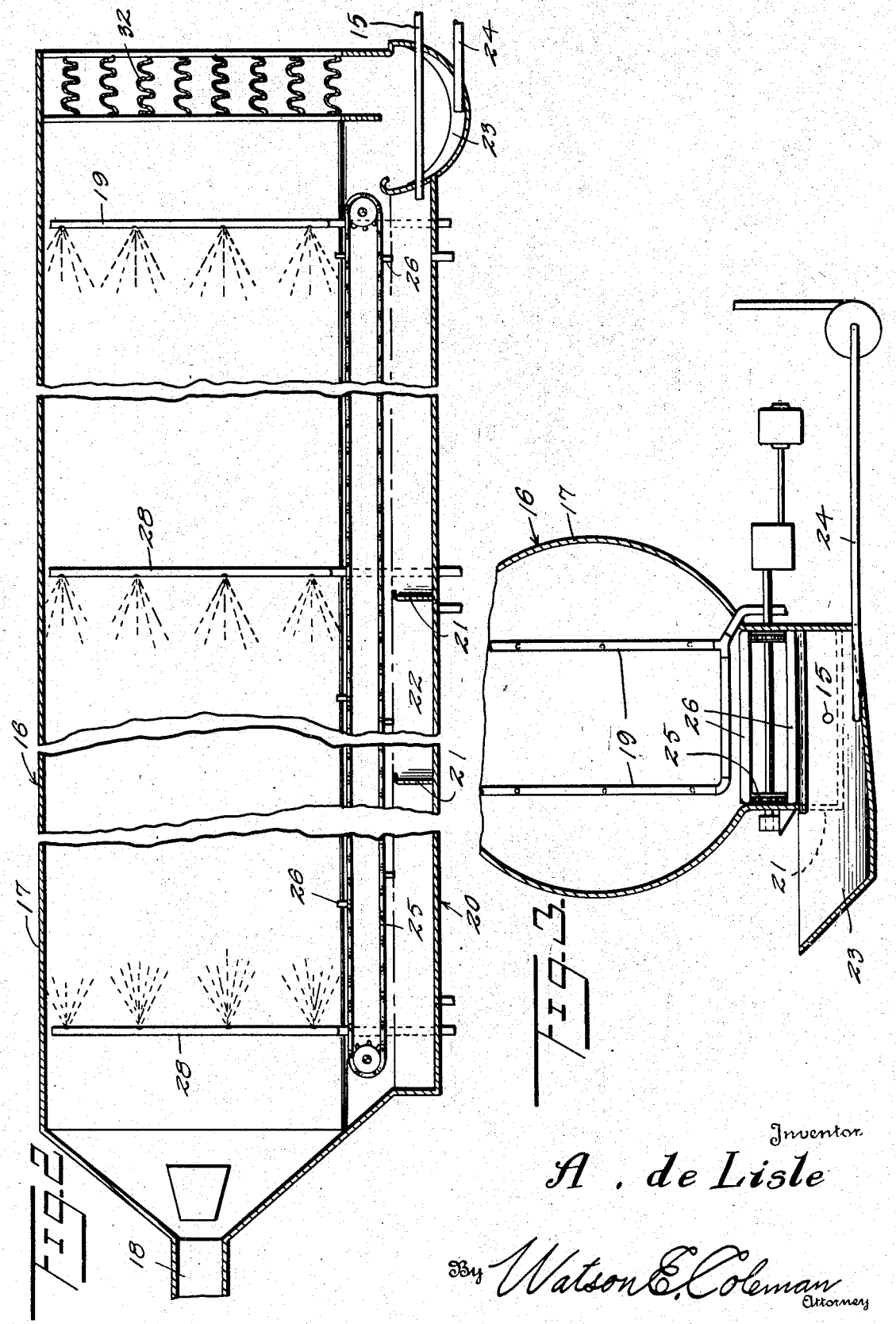
Inventor
A. de Lisle
By Watson E. Coleman
Attorney Patented Jan. 24, 1939

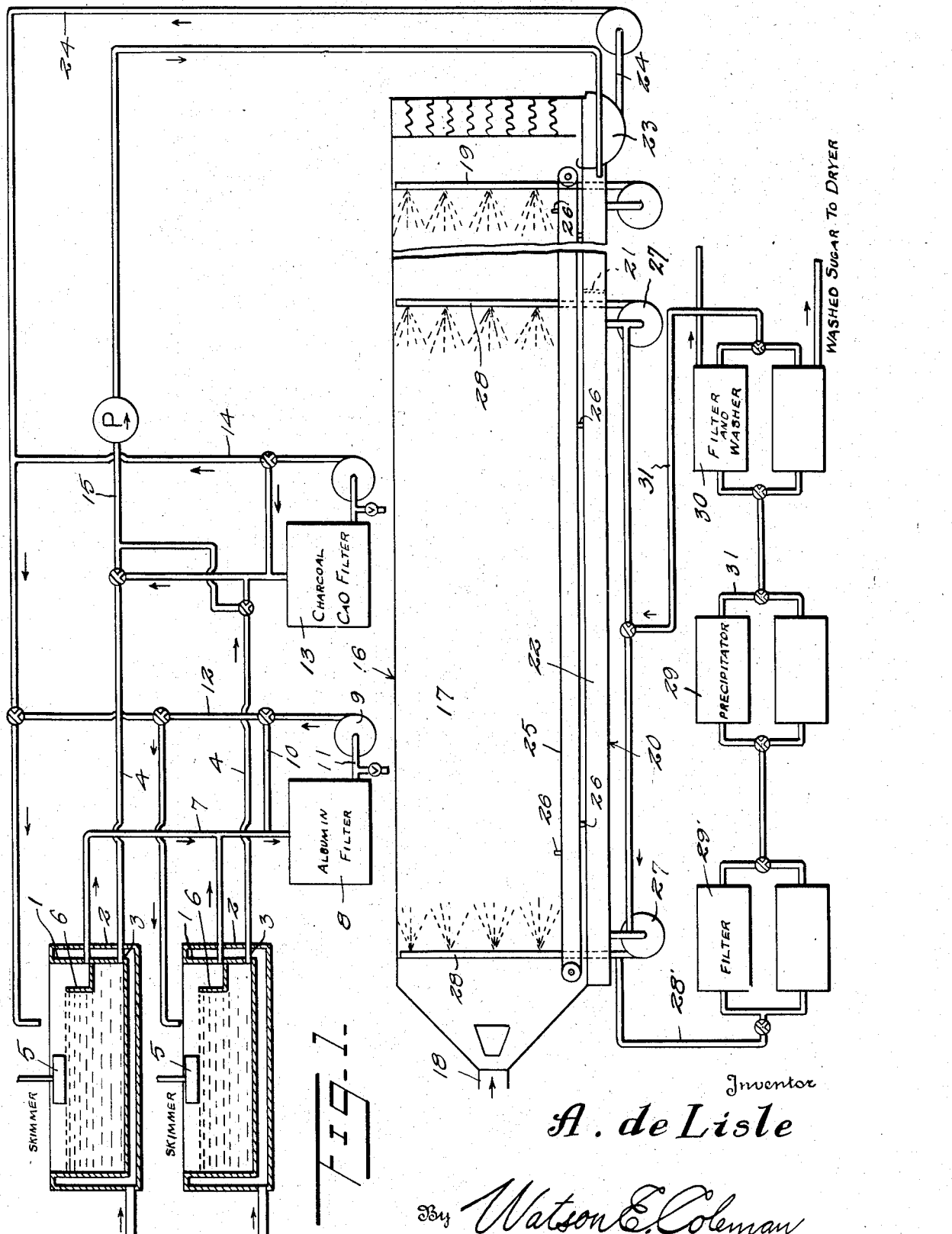

2,145,109

UNITED STATES PATENT OFFICE 2,145,109

PROCESS FOR THE MANUFACTURE OF MILK SUGAR

Auguste de Lisle, Glendale, Ariz., assignor to Associated Dairy Products Company, Glendale, Ariz., a corporation of Arizona Application March 16, 1937, Serial No. 131,233

7 Claims. (Cl. 127—31)

This invention relates to an improved process of preparing dehydrated food products and pertains particularly to the manufacture of milk sugar.

The present invention has for its primary object to provide a continuous process for the production of milk sugar in usable form as milk sugar, without the necessity of remelting the first solid products for filtration and recrystallization, as is customary in following processes as at present carried out.

Another object of the invention is to provide a new and novel process of dehydrating solids carrying liquids such as milk, skim milk, whey, buttermilk, and the like, without the use of the usual evaporators and by a continuous procedure whereby the final product will be ready for immediate use.

A still further object of the invention is to provide an improved process of preparing dehydrated products, more particularly milk sugar, which involves the novel step of using waste stack gases or other inert gases, as the drying medium, so that the product produced by the process has a more lasting quality and superior flavor than other dehydrated products in which the drying gases used contain high percentages of oxygen.

A still further object of the invention is to provide in a novel continuous process of the character hereinafter set forth, an improved form of evaporating or dehydrating chamber and novel means associated therewith for removing foam formation from the liquid under treatment so as to prevent discoloration of the final product through the charring or burning of the foam by overheating.

A still further object of the invention is to provide in a process of producing milk sugar, a novel means of obtaining the product from a supersaturated heated solution, by means of a chilling step by which the dissolved sugar is caused to be thrown out of solution.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

Figure 1 is a diagrammatic lay-out of the apparatus employed in carrying out the present process.

Figure 2 is a view illustrating diagrammatically the improved dehydrator and skimmer structure which forms a part of the apparatus.

Figure 3 is a diagrammatic sectional view taken across the end of the evaporator remote from the gas inlet end thereof.

While the present process may be used for preparing solid forms of a number of liquids such as milk, whey, etc., as previously stated, the process has been designed primarily for the production of milk sugar from whey and this particular process will first be set forth.

Stated generally, whey from casein or cheese making processes is run into a suitable tank for heating where the temperature of the same is raised to approximately 140° F. The whey is then acidulated, if necessary, to bring its acid content up to at least 0.3% and the temperature is then raised to approximately 158° F. or higher to effect precipitation of albumen and casein and the precipitated substances are then removed by any suitable process as by filtration or centrifuging. The precipitated albumen is removed and dried as a separate product.

The liquor remaining after removal of the albumen then has activated charcoal added thereto, in an amount approximating from 1 to 2% of the sugar content of the whey and after thoroughly agitating the liquid with the charcoal, a suitable alkali such as lime (calcium oxide), or calcium hydroxide is added to assist in precipitation of the carbon and other suspended impurities which are then filtered out by any suitable type of filter. The precipitate is removed and dried for separate disposal as chicken char and food.

The clear and colorless filtrate remaining after the foregoing steps have been carried out, is then evaporated by spraying the same in a suitable apparatus, hereinafter more specifically described, against a current of heated waste stack gases or flue gases or other inert gases. The waste flue gases may be used while carrying waste heat or, if necessary, they may be regenerated by cooling to remove moisture and reheating and repassing through the evaporator. This evaporating process is carried out by repeatedly spraying the liquid against the flowing gases and the liquid recovered from each spraying is skimmed to remove foam therefrom and this foam is returned into the stream of liquid passing to the sprayer and is resprayed with the cooler liquid. The spraying operation causes the liquid to take up heat from the drying gases and, therefore, the liquid initially coming into the evaporator is at a much lower temperature than that which is taken out for respraying and the skimmed off foam is preferably returned to the original liquid line so that it will enter and mix with the cooler liquid flowing to the evaporator.

The clarified liquor is concentrated by means of these successive stages of sprays to a desired point close to saturation of dissolved solids at its existing temperature (below boiling). The concentrated liquid is then run through a filter, if necessary, to remove any suspended solids and from this filter it is carried to a cooler of any suitable type where the temperature is reduced. The reduction of the temperature of the concentrated solution of milk sugar causes a precipitation of most of the sugar therein and this precipitated sugar is then filtered out in a suitable apparatus and the remaining or supernatant liquid is returned to one of the spraying stages of the evaporator to be resprayed with the other liquid coming thereinto.

The removed sugar may then be washed with water of its own or approximately of the same temperature and the washed sugar is then dried and powered and is ready for commerce. The wash water may be returned with the last filtrate, that is, the filtrate removed after precipitating the sugar from the solution, to the evaporator.

To set forth more specifically the operation of the process, reference will be made to the accompanying drawings wherein is shown, particularly in Figure 1, a diagrammatic layout of the several pieces of apparatus employed and the manner in which they are coupled together. The operation can best be described as follows;

Two tanks are preferably employed, as indicated by the numeral 1, each of which has a capacity of one day's whey production and these tanks are preferably constructed with jackets 2, so that they may be heated by steam or hot gases. These tanks 1 receive alternately the day's production of whey. Each tank has a suitable means at its bottom for removing sludge, which means is indicated in the drawings by the numeral 3 and is connected with a pipe 4 and in addition to the sludge removing means, a suitable skimming means 5 is associated with each tank for removing from the top of the liquid, the floating precipitated or flocculated albumen. This material is carried by the skimmer to a suitable chamber 6 into which it is discharged and from which it is carried through the pipe line 7 to the albumen filter 8.

After the whey has been introduced into a tank and heated to approximately 140° F., as previously stated, it is analyzed for its acid content and the content of acid raised, if necessary, to approximately 0.3% by the addition of more acid, preferably an organic acid, such as lactic, acetic or tartaric acids. The temperature is then increased to 158° F. or more, or to the boiling point, if desired. These variations control in some measure the characteristics of the precipitated albumen. The albumen, part of the globulin and fibrin are thus precipatated and, the heat being stopped, will rise to the surface where they are removed by the skimmer to the filter 8. This filter is provided with a recirculating means consisting of the pump 9 and the lines 10 and 11 so that if the first liquor passing through the filter 8 is cloudy, it may be recirculated therethrough until clear and then returned to the tank 1 through the line 12.

The albumen cake is removed from the filter and disposed of, as previously stated, and to the tank 1 in which the whey is located, there is added the activated carbon previously referred to and the precipitation of the carbon, by means of the lime or other suitable alkali, is effected in this tank. The lime is added to the extent necessary to produce a heavy and rapidly precipitating floc which is allowed to settle to the bottom and is removed through the desludging apparatus 3 to the charcoal and lime filter structure 13. As in the case of the albumen, recirculation of the material entering the filter 13, is carried out until the filtrate is clear and after this result has been obtained, the clear filtrate is returned by the line 14 to the particular tank which is in use.

The now clear colorless liquid is passed from the tank 1 by means of the pipe line 15, to the first stage of the drier or evaporator.

The evaporator is indicated generally by the numeral 16 and comprises an elongated chamber 17 having the inlet 18 at one end through which the hot flue gases or other inert gases are introduced for passage longitudinally through the chamber. Adjacent the end of the evaporator chamber remote from the inlet 18, the pipe line 15 enters the evaporator structure, as illustrated in Figure 1. Also, adjacent this end of the evaporator structure is a spray unit which is generally designated by the numeral 19.

The bottom of the evaporator is in the form of a long trough or sump 20 which is transversely divided at spaced intervals by partitions 21 so as to form a series of individual receptacles 22 and extending transversely of the evaporator structure at the end of the long trough-like bottom portion 20 remote from the inlet 18 is a foam receiving sump 23. This sump has leading from the lower part thereof a pipe line 24 which is employed to return foam which has been collected in the sump 23 from the top of the liquid in the receptacles 22, back to the pipe lines leading to the receptacles 1 from the lines 12 and 14. It will thus be seen that the foam which gathers in the sump 23 will be returned to the receptacle from which the liquid is flowing to the spray units of the evaporator, where it will be cooled and resprayed with the cooler liquid.

Extending longitudinally of the evaporator directly above the receptacles 22, is an endless conveyor structure, which is designated 25, and which carries a plurality of transverse wiper blades 26. By means of suitable power mechanism, this conveyor is operated to move the wipers 26 with the lower run of the conveyor from the inlet end of the evaporator structure toward the foam receiving sump 23. The wipers are so adjusted that their free edges will just skim the surface of the liquid in the receptacles 22 and pass over the top edges of the partitions 21 so that foam will be removed from the top of the liquid in the receptacles and carried across the inner edge of the sump 23 which extends transversely of the evaporator.

Each of the liquid receptacles 22 has a sprayer unit associated therewith, the sprayer units, in addition to the unit 19 previously referred to, being indicated by the numeral 28. Each of these units 19 and 28 is connected with the outlet side of a pump 27 which has its inlet connected directly with the receptacle adjacent which the sprayer unit is located. The outlets of the sprayer units are preferably directed laterally in the evaporator structure so that the clarified whey liquor will be discharged generally toward the sides of the evaporator from which it will flow down into the receptacles from which it was drawn. It is preferred also, although this arrangement is not essential, that the general direction in which the liquid is discharged from the spray unit nearest the inlet 18, be away from this inlet whereas the other units are so arranged that the liquid discharged therefrom may move in the general direction of the hot air or gas inlet for the evaporator. Regardless of whether the nozzle is to be turned with or against the direction of the flow of the gases, the fluid (whey) flow is counter to the gases, (i. e.) the least concentrated liquor, entering through the nozzles of the spraying units 19, encounters the coldest and most saturated gas and thus, stage by stage, passes through successive sprays, becoming more and more concentrated and encountering less and less saturated gas of higher and higher temperature.

This order of spraying is used because the aqueous vapor tension differential between the drying medium and the solution is reduced by concentration; that is, a concentrated solution holds its water more readily than a dilute and the differential of aqueous vapor tension increases with the temperature differential of the drying medium and solution, the drying medium being higher than the solution, of course, permitting greater absorption of water from the solution by the drying agent. Also, unless these differentials are so taken advantage of, it would be nearly impossible to achieve the desired degree of concentration.

The spray outlets of the units 19 and 28, as previously stated, project the whey at an angle to the longitudinal axis of the dryer and onto the walls of the same, as well as dropping the whey directly into the pan below. The last stage of sprays is directed with the flow of gases for the purpose of preventing deposition of the highly concentrated whey in too hot a zone with the consequent risk of baking and charring the concentrated liquor.

It will thus be seen that the circulation of the whey liquid in the evaporator is out of one pan through the pump and spray unit directly associated therewith and back to the same pan and the flow from this pan is over the dividing wall 21 into the next pan or receptacle.

Leading from the last receptacle 22 which is the one nearest the inlet 18, is a pipe 28' through which the concentrated liquid passes to one of the two filter units 29' which are connected in parallel, as shown and controlled by suitable valves so that a selected one of the units may be used. The liquid concentration proceeds in the evaporator preferably until it reaches at least 65% of saturation of sugar at the temperature of the solution and the liquor at this concentration is then withdrawn by means of the pipe line 28' and passes while hot or as near as possible to the temperature of withdrawal through the filter 29', thus removing suspended impurities. The liquid, after final filtration is then carried to a precipitator 29 where it is subjected to chilling or cooling so that the temperature is substantially reduced as, for example, from a high of around 150° F. to approximately 72° F. This chilling action effects the precipitation of the major portion of the milk sugar from the concentrated solution and the precipitate is then passed to a washer 30 and the remaining or supernatant liquid may be returned to the evaporator for respraying with the other liquid passing therethrough. The sugar is washed with water having a temperature of approximately the same degree as the sugar and the wash water is also returned to the evaporator as by the line 31, so that any sugar dissolved therein may be reobtained with the next precipitation.

From the foregoing, it will be readily apparent that with the present process, the production of milk sugar can be made continuous and that the possibility of charring or discoloring the same is remote because of the constant removal of the foam from the evaporator.

Where the process is to be used for the production of dried products from whole whey, milk, skim milk, butter milk or any liquid or fluid containing solids in suspension, the solution or suspension to be dehydrated is introduced to the first stage of the spray drier and passes, as before described, from stage to stage. The foam produced is removed by the skimmer and reliquefied before introduction.

When the liquor has reached a concentration of 20 to 30% solids in its counter-flow to the hot gases, it is atomized by a mechanical spray in its last stage and dried to completion, being removed either as it falls onto a suitable moving receiver or by means of suction or any other one of the well known methods of removing materials from dehydrating apparatus.

The evaporator structure at the rear end over the foam receiving sump 23 is of standard construction and has, therefore, been only diagrammatically illustrated. Such standard construction comprises a plurality of horizontally disposed corrugated plates 32 arranged in vertically spaced relation so that the moisture laden heated air or gases which have passed through the evaporator will be required to follow a zig-zag course before escaping through the open rear end thereof and thus, through contact with these plates, deposit the entrained moisture on the plates from where it may drain back into the underlying sump 23. The gases after passing out of the rear end of the evaporator may be discharged into the atmosphere or may be mixed with other gases of high temperature to reduce the temperature of the said other gases to the proper degree to be returned into the evaporator through the entrance opening 18 for reuse.

I claim:—

1. The continuous process for the production of milk sugar, which comprises heat treating whey having an acid content of at least 0.3% at a temperature ranging between 158° F. and its boiling point to effect precipitation of albumen and casein but not permitting the whey to boil, removing the precipitated albumen and casein, adding activated charcoal to the supernatant liquid, precipitating the charcoal with lime to clarify the liquid, evaporating the liquid remaining after removal of the charcoal by repeatedly spraying the same against a current of a heated drying fluid until a desired concentration of the liquid is obtained, chilling the concentrated liquid to effect precipitation of milk sugar therefrom, and recovering the precipitated sugar and drying the same.

2. The continuous process for the production of milk sugar from whey, which comprises acidulating the whey by addition of one of the group consisting of lactic, acetic and tartaric acids if necessary to bring the acid content to 0.3%, heat treating the acidulated whey at a temperature sufficient to precipitate the albumen and casein and without permitting the whey to boil, removing the precipitate, adding activated charcoal to the supernatant liquid in the proportion of from one to two percent of the same to the sugar content, effecting flocculation of the charcoal and clarification of the liquid by precipitating with one of the group consisting of calcium oxide and calcium hydroxide, removing the precipitated floc, concentrating the clarified liquid by repeatedly spraying the same against a current of a heated drying and inert gas until a desired concentration is obtained, precipitating milk sugar from the concentrated liquid by reducing the temperature thereof, and finally recovering and drying the precipitated sugar.

3. The continuous process for the production of milk sugar, which comprises the progressive steps of raising the acid content of whey to approproximately .3% by addition of one of the group consisting of lactic, acetic and tartaric acids, raising the temperature of the acidified whey to not higher than the boiling point to precipitate albumens by effecting coagulation of the same, clarifying the supernatant liquid by use of activated charcoal and lime in the order named, concentrating the clarified liquid by contacting the same with a heated inert gas and simultaneously raising the temperature of the liquid by such contact, and effecting precipitation of milk sugar from the concentrated liquid by rapid cooling.

4. The continuous process for the production of milk sugar which comprises the progressive steps of bringing the acid content of whey by at least .3% by the addition thereto of tartaric acid raising the temperature of the whey to at least 158° F. and not higher than the boiling point thereof to effect precipitation of albumen and casein, removing the precipitate, clarifying the supernatant liquid for removal of impurities by adding activated charcoal and precipitating with lime, evaporating the clarified liquid by repeated spraying of the same against a current of heated inert gas to reduce the liquid to a desired concentration, precipitating the milk sugar from the concentrated liquid by chilling the liquid, and removing and drying the precipitate.

5. The continuous process for the production of milk sugar, which comprises raising the acid content of whey from casein or cheese manufactories to approximately .3% by the addition thereto of an organic acid selected from the group consisting of lactic, acetic and tartaric acids, then increasing the temperature of the acidulated whey to at least 158° F. to effect precipitation of albumen, globulin and fibrin, removing the precipitate, then adding activated carbon to the supernatant liquid, then precipitating the carbon by the addition to the liquid of an alkali selected from the group consisting of calcium oxide and calcium hydroxide, removing the precipitate, and finally concentrating the liquid to effect the extraction therefrom by crystallization of the milk sugar.

6. The continuous process for the production of milk sugar, which comprises heating whey from casein or cheese manufactories to a temperature of approximately 140° F., then raising the acid content of the heated whey to approximately .3% by adding one of the group consisting of lactic, acetic and tartaric acids, then further raising the temperature of the acidulated liquid to at least 158° F. and not higher than the boiling point thereof by which the precipitation of albumen, globulin and fibrin is effected, removing the precipitate, then adding activated carbon to the supernatant liquid, then adding calcium oxide in sufficient quantity to effect precipitation of the carbon, removing the precipitated carbon and calcium, and finally concentrating the liquid to effect crystallization of the milk sugar and extracting the same.

7. A continuous process for the production of milk sugar, which comprises increasing the acid content of whey to approximately .3% by the addition of tartaric acid thereto, then heating the acidulated whey to at least 158° F. whereby precipitation of albumen is effected, removing the precipitated albumen, then mixing with the supernatant liquid activated carbon in an amount approximating from 1% to 2% of the sugar content of the whey and thoroughly agitating the carbon containing liquid to effect thorough distribution of the carbon therethrough, then adding calcium hydroxide to the carbon containing liquid to effect the precipitation of the carbon and residual albumen, separating the precipitate from the liquid, and finally concentrating the liquid to effect extraction of the contained milk sugar by crystallization.

AUGUSTE DE LISLE.